April 24, 1956 J. GIUFFRIDA 2,743,389

TELEVISION CIRCUIT

Filed Jan. 28, 1954 2 Sheets-Sheet 1

INVENTOR.
Joseph Giuffrida

BY George W. Crowley

ATTORNEY

INVENTOR.
Joseph Giuffrida
BY George W. Crowley
ATTORNEY

United States Patent Office 2,743,389
Patented Apr. 24, 1956

2,743,389

TELEVISION CIRCUIT

Joseph Giuffrida, Peabody, Mass., assignor to Columbia Broadcasting System, Inc., Danvers, Mass., a corporation of New York, doing business under the name CBS-Hytron Application January 28, 1954, Serial No. 406,685
6 Claims. (Cl. 315—13)

This invention relates in general to color television and in particular to color television picture tubes.

The picture tubes most commonly used at present are those which include three guns, a shadow mask, and a screen composed of many phosphor dots arrayed in symmetrically disposed trios. The shadow mask has an aperture for each trio of phosphor dots and each phosphor dot of a trio emits one of the three primary colors: red, blue, and green upon excitation. The dots are so disposed relative to the apertures of the mask that each electron beam as it scans impinges upon only one type of dot of each trio. By proper modulation of all three beams, a picture in full color can be presented.

However, in practice, it is necessary to provide additional precautions to assure convergence of the three electron beams at each aperture of the mask. This is so because the locus of convergence points of three beams is a spherical surface. When the beams are deflected and have only a static converging voltage applied thereto, such a spherical surface bears little or no relation to the actual curvature of a practical mask and, hence, the beams under such conditions fail to converge at all apertures of the mask. It is necessary to provide a converging voltage or current which varies as a function of the deflection of the beams. The point of convergence of the beams is thus moved further from the guns as the angle of deflection increases. For smaller tubes, such dynamic convergence is usually obtained by applying a modulating voltage to a single electrode within the tube. This electrode acts upon all three beams simultaneously and provides fairly satisfactory results in such smaller tubes.

It has been found, however, that due primarily to non-uniformity of yoke deflection fields at maximum angles of deflection, the conventional dynamic convergence method outlined above is insufficiently effective. In short, the present dynamic convergence circuits are seriously deficient in large screen picture tubes which results in poor tube performance.

Therefore, it is an object of the present invention to provide effective convergence in large screen color television picture tubes.

It is a further object to provide improved performance in large screen color television picture tubes.

It is a still further object to provide more precise control of each electron beam in a color television picture tube.

In general, the present invention consists in a circuit and apparatus for dynamically controlling each of the electron beams in a color television picture tube independently. To achieve this purpose, signals are extracted from the deflection yokes or from suitable amplifiers in the deflection circuits. These signals are supplied to electromagnets which are adjustably mounted about the neck of the picture tube, each electromagnet being in proximity to one of the electron beams. The currents passing through the electromagnets as well as the physical disposition of the electromagnets are adjustable. By means of these adjustments, each beam may be dynamically controlled independently of the other two beams. Thus, compensation of whatever type necessary may be made for yoke deflection field non-uniformity, or other factors affecting dynamic convergence. For a better understanding of the invention, together with other and further objects, features, and advantages, reference should be made to the following description which is to be read in connection with the accompanying drawings in which:

Figure 1:
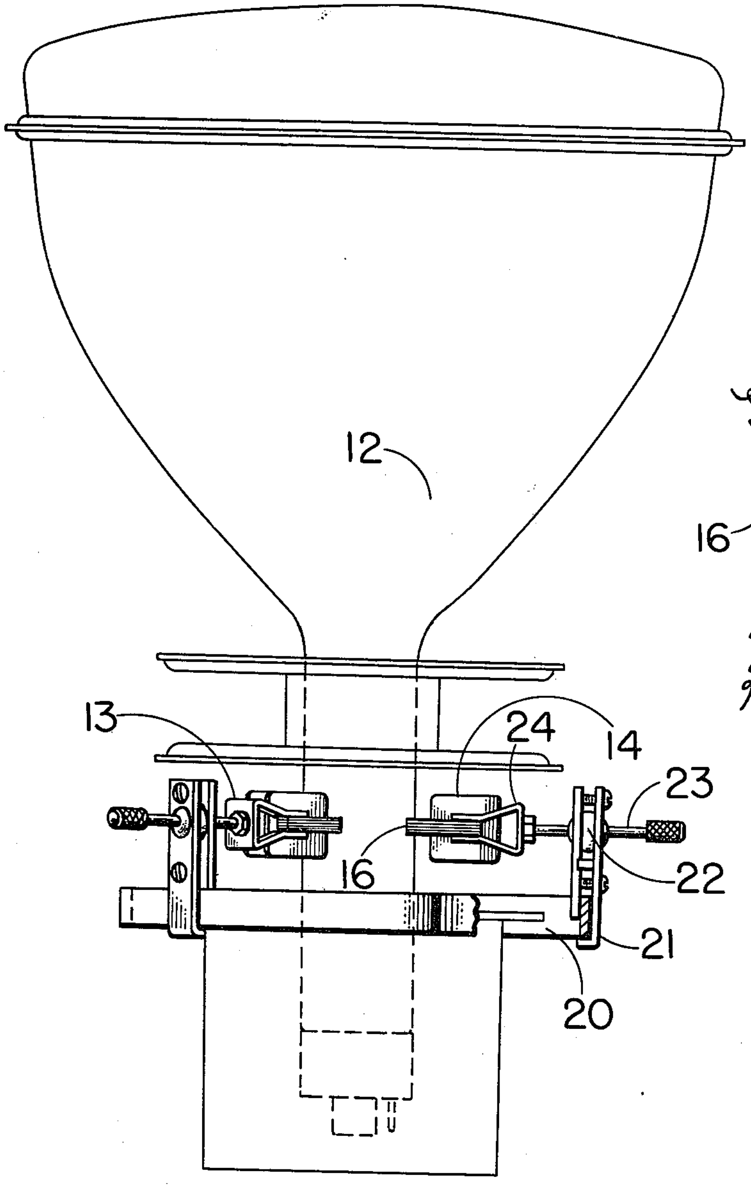
Fig. 1 is an elevation view of a picture tube showing the three electromagnets as they are arranged in a preferred embodiment of the invention.
Figure 2:
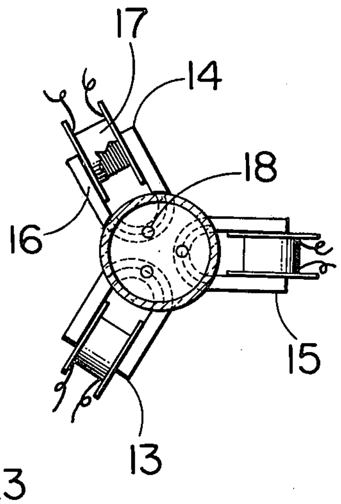
Fig. 2 is an idealized sectional view taken through the neck of the tube shown in Fig. 1 adjacent the electromagnets.

Referring particularly to Figs. 1 and 2, there is shown a color television picture tube 12. Disposed at three points about the neck portion of tube 12 are electromagnets 13, 14, and 15. In tubes utilizing three electron guns, the electromagnets are preferably in the same planes radial of the tube axis as the electron guns. In those instances where a single gun is used and the beam rotated or otherwise separated to provide three effective beams, the electromagnets would, of course, be located similarly with reference to the beams rather than to the guns.

Each of the electromagnets includes a substantially U-shaped core as at 16 in electromagnet 13. Wound on the central portion of each core is a coil as at 17. The electromagnets are disposed such that the axes of the coils lie in planes perpendicular to the axis of tube 12. As may be seen in Fig. 2, this orientation of the electromagnets provides magnetic flux as indicated by the dotted lines. Electron beams, of which beam 18 is typical, are ideally represented in Fig. 2 by the circular symbols. The fields about the electromagnets are confined to areas which are well limited by the extensions of the U-shaped cores. Thus, each electromagnet is effective only upon the electron beam associated therewith. By utilizing the U-shaped cores, with the open ends extending inwardly, each beam may be closely controlled and a minimum of interaction between electromagnets exists. This permits the independent beam adjustment which is necessary to good performance.

In Fig. 1 it may be seen that physical adjustment of electromagnet position is easily accomplished. Each electromagnet is mounted on a flange 20 by means of a clamp such as 21, which is typical. Clamp 21 encloses a split sphere 22 through which a support rod 23 passes. Attached to support rod 23 is a spring clamp 24 which holds laminated bore 16. Split sphere 22 engages rod 23 by friction established by tightening the screws of clamp 21 to a sufficient degree. Rod 23 may be moved radially of tube 12 or may be rotated in split sphere 22 as may be necessary to obtain proper action on the electron beam associated with electromagnet 14.

Figure 3:
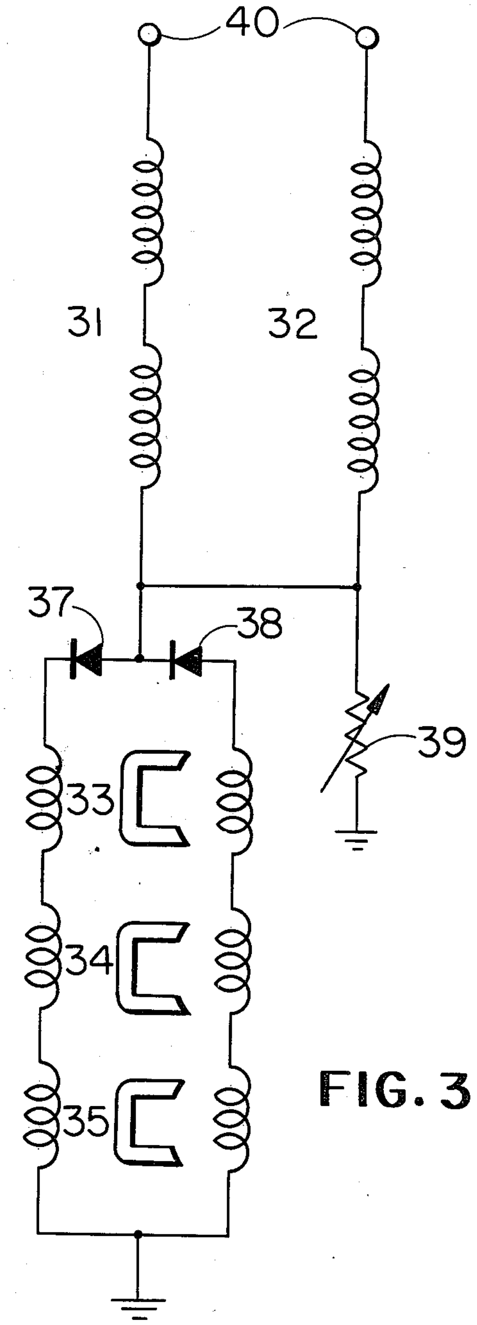
Fig. 3 is a schematic diagram of a preferred embodiment of the circuit used to provide signals for dynamic convergence.

Referring now to Fig. 3, one embodiment of the electrical circuitry of the invention is shown schematically. In this embodiment, coil 31 represents the horizontal deflection yoke coil and coil 32 represents the vertical deflection coil. Three electromagents 33, 34, 35 are provided, and each of these electromagnets includes a U-shaped core. On the central portion of the core there are wound two coils as shown. The mounting and disposition of each electromagnet corresponds to that shown for electromagnets 13, 14, and 15 in Figs. 1 and 2.

Two rectifiers 37 and 38 are connected together and have opposite terminals connected in series relationship to each group of coils of each electromagnet. The junction of rectifiers 37 and 38 is connected to the junction of horizontal and vertical deflection yoke coils 31 and 32 and to a rheostat 39. Rheostat 39 is in parallel circuit relationship to the electromagnet coil groups.

In operation, horizontal and vertical deflection currents are passed through the deflection yoke from the terminals 40 to ground. The deflection signal is preferably obtained at the yoke, but may be extracted from other deflection circuit components, if desired. Adjustment of rheostat 39 permits the currents passing through the electromagnet coil groups to be varied. When the signal at the junction of rectifiers 37 and 38 is negative, currents pass through the coils at the left as seen in the diagram. When the signal at the rectifier junction is positive, currents pass through the coils at the right as shown. The coils are wound on the cores in such a direction that the magnetic fields generated tend to force the beams radially outward from the axis of the tube as the strength of the currents increases. Although in this embodiment, adjustment is only possible of the currents flowing through all electromagnets, the extent of the radial excursion of each beam may be controlled by independent physical movement of each electromagnet as well as by current adjustment. The radial outward movement of the beams, of course, causes more remote beam convergence.

Figure 4:
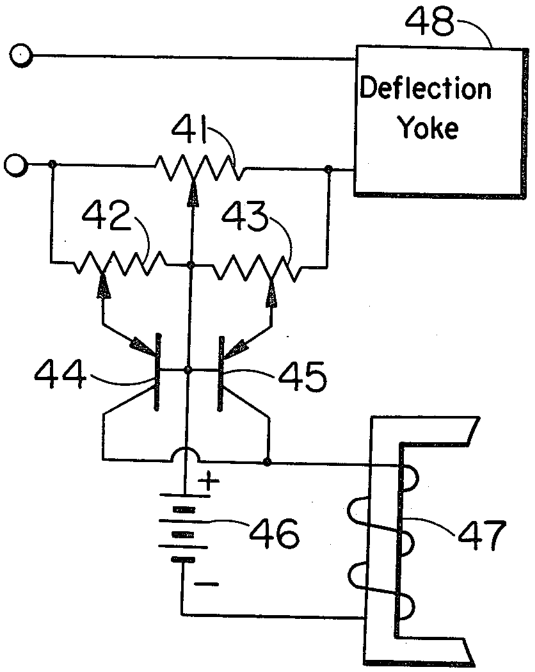
Fig. 4 is a schematic diagram of an alternative circuit for providing dynamic convergence.

Referring now to Fig. 4, an alternative embodiment of the circuit of the invention is shown. For purposes of simplicity, only one electromagnet and amplifier are shown. It is to be understood, however, that three separate electromagnets and amplifiers are used in the complete circuit in the manner indicated in Figs. 1 and 2. It should be further understood that, although transistor amplifiers are illustrated and described, any one of several suitable vacuum tube amplifiers may be substituted for the transistors.

The circuit of Fig. 4 includes a deflection yoke 48 from which signals are coupled by means of an impedance 41 connected in series therewith. This impedance 41 may be a linear resistance through which yoke currents pass. An adjustable tap is placed on resistance 41, and is connected to the junction of resistances 42 and 43. Return leads run respectively from the opposite ends of resistances 42 and 43 to the ends of resistance 41. Resistances 42 and 43 are also tapped, and the taps from these resistances run to the respective emitters of transistors 44 and 45. The collectors of transistors 44 and 45 are connected together and to one end of the coil of an electromagnet 47. A source of direct voltage 46 has its positive terminal connected to the bases of transistors 44 and 45 and its negative terminal is returned to the collectors of transistors 44 and 45 through the coil of electromagnet 47.

The operation of the circuit of Fig. 4 is similar to that of the circuit of Fig. 3, but a greater degree of adjustment is possible. As has been noted, other amplifiers may replace the transistors, but the transistor has inherent characteristics which may be advantageously employed. The voltage developed across linear resistance 41 is a conventional sawtooth, the currents passing through deflection yoke 48 and resistance 41 being of a sawtooth configuration. The voltage at each end of resistance 41 is alternatively positive and negative. Hence, the voltage at the emitter of each transistor is alternatively positive and negative. The emitter voltage-emitter current curve of a transistor such as used herein is such that a power law relationship exists for small applied voltages. Thus, considering either transistor, as the emitter voltage increases, emitter current increases as the square of that voltage. A parabolic current wave form is thus developed by reason of the oppositely connected transistors, each transistor developing half of the parabola as voltage of the proper polarity exists at its emitter terminal.

This parabolic emitter current wave form then appears linearly amplified as collector current, such being the nature of transistor amplification. The collector currents are passed through the coil of electromagnet 47 and magnetic fields varying with deflection of the electron beam are thus created. The tap on resistance 41 permits either peak of the parabolic wave to be accentuated as desired, and the taps on resistances 42 and 43 permit adjustment of either half of the parabola.

With three such circuits operating to provide proper signals to three electromagnets about the neck of the picture tube, adjustment of the beam to obtain convergence is possible despite variations or asymmetrical factors of considerable magnitude. The same physical electromagnet adjustments shown in Figs. 1 and 2 are, of course, retained in embodiments using the circuit of Fig. 4, and the range of adjustment is extended further still. While what has been described constitutes preferred embodiments of the invention, numerous modifications will suggest themselves to those skilled in the art. The basic concept of providing independent electromagnetic convergence controls of each beam is believed to be the essence of the present invention which should be limited only by the spirit and scope of the appended claims.

What is claimed is:

1. In a multiple electron beam color television picture tube of the aperture mask type, apparatus for converging said electron beams at the apertures of said aperture mask comprising, an electromagnet disposed adjacent to each of said electron beams, means for passing currents of a predetermined waveshape through said electromagnets, and means for independently varying the disposition of said electromagents relative to said electron beams.

2. Apparatus as in claim 1 including means for varying the magnitude and the waveshape of said currents.

3. Dynamic convergence apparatus for a color television picture tube having three electron beams and deflection elements for deflecting said beams comprising, an electromagnet mounted adjacent each said electron beam, means for physically adjusting the position of each said electromagnet, and an energizing circuit for each said electromagnet, each said energizing circuit including, a linear impedance in circuit with said deflection elements, a tap on said linear impedance, two transistors, the tap on said linear impedance being directly connected to the bases of said transistors, one end of said linear impedance being connected to the emitter of one of said transistors, the other end of said linear impedance being connected to the emitter of the other of said transistors, the collectors of said transistors being connected to one end of the coil of said electromagnet, a source of direct voltage being connected between the bases of said transistors and the other end of said coil, whereby parabolic current waves are passed through said electromagnets to cause said electron beams to converge at greater distances from their sources as said electron beams are deflected.

4. Dynamic convergence apparatus for a color television picture tube having an aperture mask and multiple electron beams comprising, means for deflecting said electron beams, an electromagnet disposed adjacent each of said electron beams, means for passing currents varying according to the output of said deflecting means through said electromagnets, means for varying the magnitude and waveshape of said currents, and means for independently varying the positions of said electromagnets relative to said electron beams.

5. Dynamic convergence apparatus for a color television picture tube having an aperture mask and multiple electron beams comprising, yoke coils disposed about the neck of said tube for deflecting said electron beams, means for deriving currents varying as the currents in said yoke coils, means for rectifying said currents, an electromagnet disposed adjacent each of said electron beams, means for passing the output of said rectifying means through said electromagnets in such a direction that magnetic fields are generated to force said electron beams radially apart, means for varying the magnitude and waveshape of said currents, and means for independently varying the positions of said electromagnets relative to said electron beams.

6. Dynamic convergence apparatus for a color television picture tube having three electron beams and deflection elements for deflecting said beams comprising, an electromagnet mounted adjacent each said electron beam, means for adjusting the positions of said electromagnets relative to said electron beams, and an energizing circuit for each said electromagnet, each said energizing circuit including, a linear impedance in circuit with said deflection elements, means for deriving a signal from said linear impedance, means for rectifying the signal so obtained according to a square law relationship to obtain a parabolic current wave form, means for linearly amplifying the parabolic current wave form, and means for passing said amplified parabolic current wave forms through said electromagnets to cause radial separation of said electron beams.

References Cited in the file of this patent

UNITED STATES PATENTS

| | | |
|---|---|---|
| 2,591,159 | Kabuss | Apr. 1, 1952 |
| 2,672,574 | Evans | Mar. 16, 1954 |
| 2,677,779 | Goodrich | May 4, 1954 |